July 4, 1944.        J. W. ARMBRUSTER        2,353,001
ACCOUNTING MACHINE
Filed Dec. 30, 1937        8 Sheets-Sheet 1

INVENTOR
John W. Armbruster
BY
W. M. Wilson
ATTORNEY

July 4, 1944.  J. W. ARMBRUSTER  2,353,001
ACCOUNTING MACHINE
Filed Dec. 30, 1937  8 Sheets-Sheet 2

INVENTOR
John W. Armbruster
BY
ATTORNEY

July 4, 1944.    J. W. ARMBRUSTER    2,353,001
ACCOUNTING MACHINE
Filed Dec. 30, 1937    8 Sheets-Sheet 3

INVENTOR
John W. Armbruster
BY
ATTORNEY

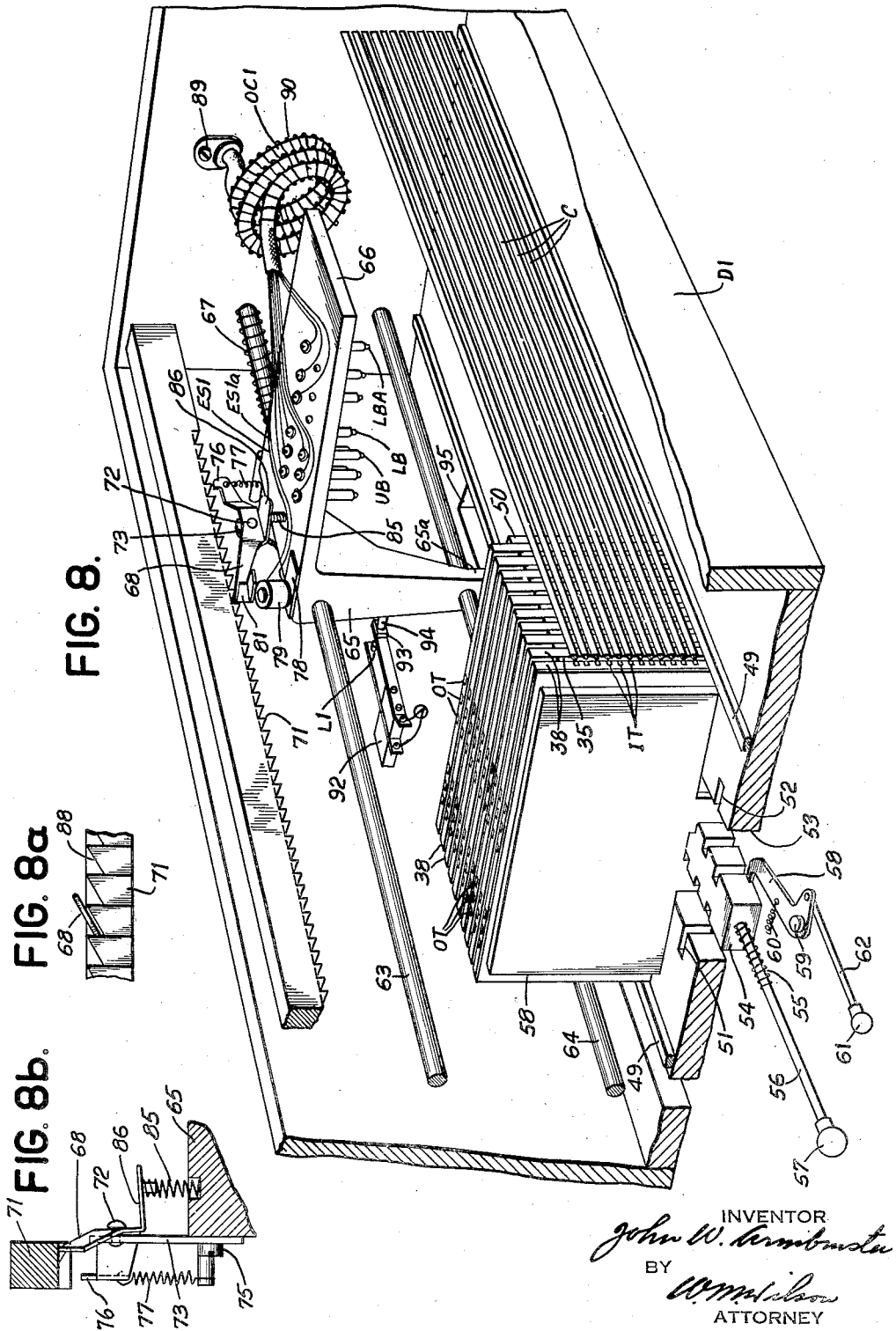

July 4, 1944.  J. W. ARMBRUSTER  2,353,001
ACCOUNTING MACHINE
Filed Dec. 30, 1937   8 Sheets-Sheet 5
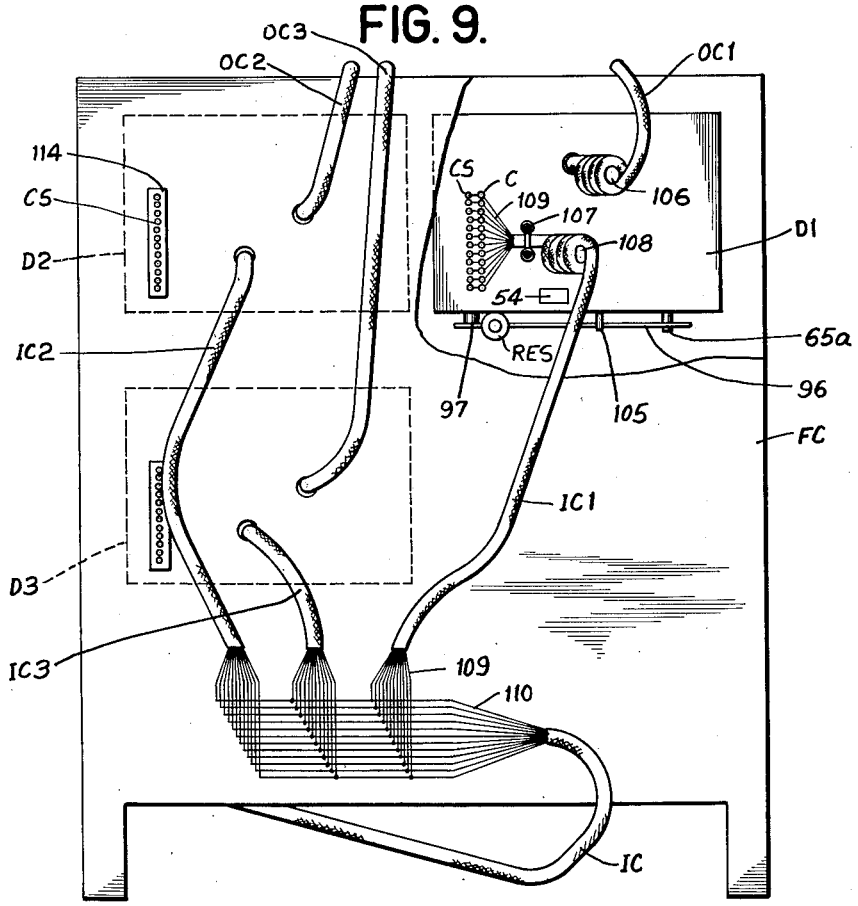
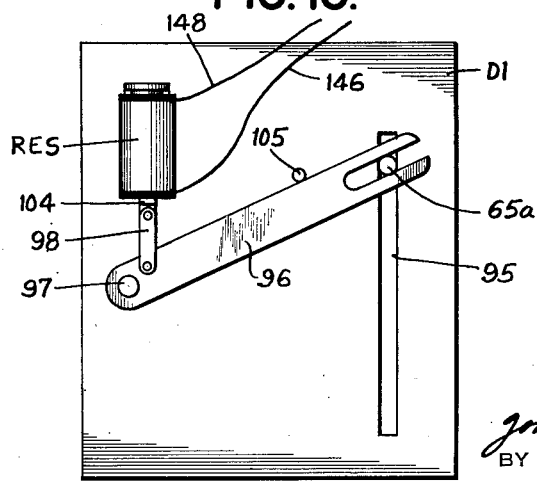

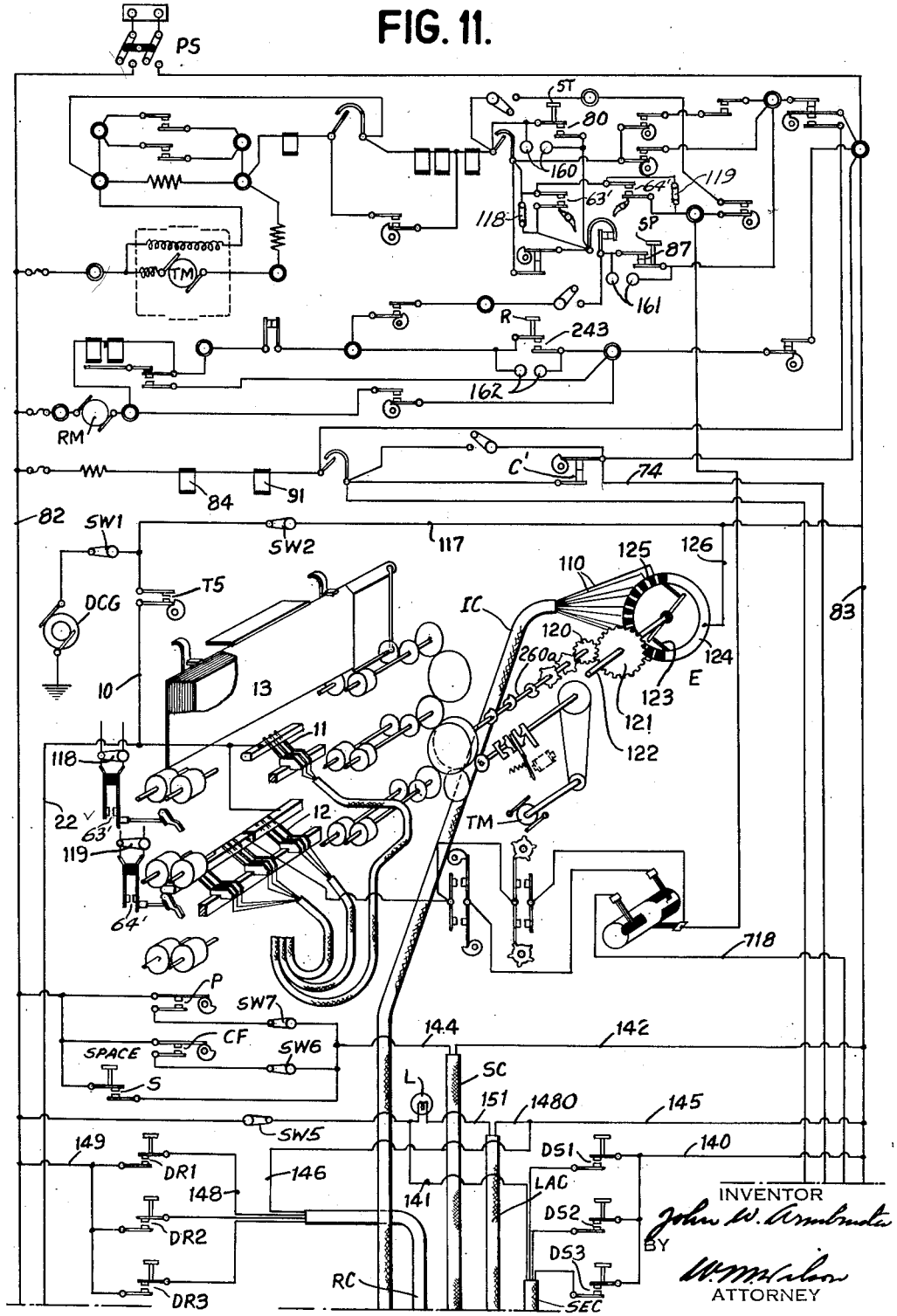

Patented July 4, 1944

2,353,001

UNITED STATES PATENT OFFICE 2,353,001

ACCOUNTING MACHINE

John W. Armbruster, East Rockaway, N. Y., assignor to International Business Machines Corporation, New York, N. Y., a corporation of New York Application December 30, 1937, Serial No. 182,455

9 Claims. (Cl. 235—61.7)

This invention relates to an advanced form of record controlled accounting machine wherein the records remain undisturbed in a file while being analyzed to control devices for accumulating and printing the data represented on said records. The novel construction of the record as a machine control element is also a feature of this invention, because it is by means of selectively connected conducting lines on, or controlled by, the record that a series of records may be sensed successively even when filed close together in a compartment or file drawer.

Heretofore, in order that accounting information could be gathered from record cards, it was necessary to remove such cards from a file, place them in an accounting machine, feed and sense them one by one, and then return them to the file.

It is an object of the present invention to provide record sensing devices of such a character that they may be installed in a file drawer and there operate to sense the data on stationary filed records.

An object of the invention is the provision of means for sensing a stationary perforated record, said means comprising a pair of grids with wires adapted to be pressed against both sides of the record; the wires on one grid representing digits and the wires on the other grid selectively contacting therewith through the perforations in the record to form an electric read out means representing the number characterized by the locations of the perforations in the record.

Another feature of the invention is the provision of novel connections between an accounting machine and a remote file of records, whereby the records are sensed while stacked in the file and while at rest and thereby control the accumulating and printing operation of the machine. The records may be found in a plurality of drawers of the file, therefore the connections at the tabulator include controls for remote selective control of the sensing means whereby a particular drawer, a certain record in said drawer, and a certain column of information on said record may be automatically selected and sensed from the accounting machine.

In an alternative mode of operation by means of devices disclosed hereinafter, instead of controlling the sensing of records in a remote file by an operator stationed at the accounting machine, an operator located at the file may control a remote accounting machine. Manipulative sensing devices may be brought into cooperation with any part of any record in any drawer and then remote connections to the machine start, stop and reset keys contacts may be operated to control the tabulator.

A further object of the invention is to provide group control devices for detecting the grouped arrangement of filed records and controlling an accounting machine to print a total of the amounts of each group. The filed records are stacked in groups with a group number represented on each record by one set of impulse conducting lines extending to the edge of the record. A pair of sensing devices spaced apart the distance between adjacent record edges are mounted on a carriage which moves them from record to record. Comparing devices are connected between the sensing devices to receive impulses representative of group numbers and thereby determine the point in the file at which one group ends and the next group begins.

An object of the invention is to provide means for selecting from a remote point, one of a plurality of sensing carriages associated with files of records. Remote means for manually and automatically spacing said carriage and means for restoring the carriage are also provided. An indicator situated at the tabulator is electrically controlled by said carriages for showing when all the carriages are restored to starting position, and when all carriages are restored except the one selected for operation.

Another feature of the invention is the construction of a filing compartment or drawer wherein there is mounted a set of impulse conductors arranged to be common to a plurality of record reading wire grids in the file. The compartment also contains traveling sensing devices on a carriage for moving from record to record to read out the data represented thereby. A pressure device is provided to hold the records at regularly spaced intervals in the file and also serves to press the selected wires of the grids into contact for assuring the conduction of electric impulses therethrough.

An object of the invention is the provision of sensing devices adapted to cooperate with perforated records formed of thin paper stock. Since the records remain stationary and are supported by the grids, they need not be formed of stiff card stock; instead, thin inexpensive paper may be used.

Other objects of the invention will be pointed out in the following description and claims and illustrated in the accompanying drawings, which disclose, by way of example, the principle of the invention and the best mode, which has been contemplated, of applying that principle.

In the drawings:

Fig. 8 is a perspective view of the interior of a record file provided with impulse receiving, record card indicia detecting and impulse conducting devices.

Fig. 8a is a detail view of a portion of the sensing carriage escapement rack.

Fig. 8b is a sectional elevation detail view of the escapement mechanism associated with the grid sensing carriage.

Fig. 9 is a rear elevation view of a filing cabinet containing a plurality of compartments or drawers for holding the records and associated grids.

Fig. 10 is a bottom view of one of the compartments showing a restoring device for the sensing carriage.

Figure 11A:
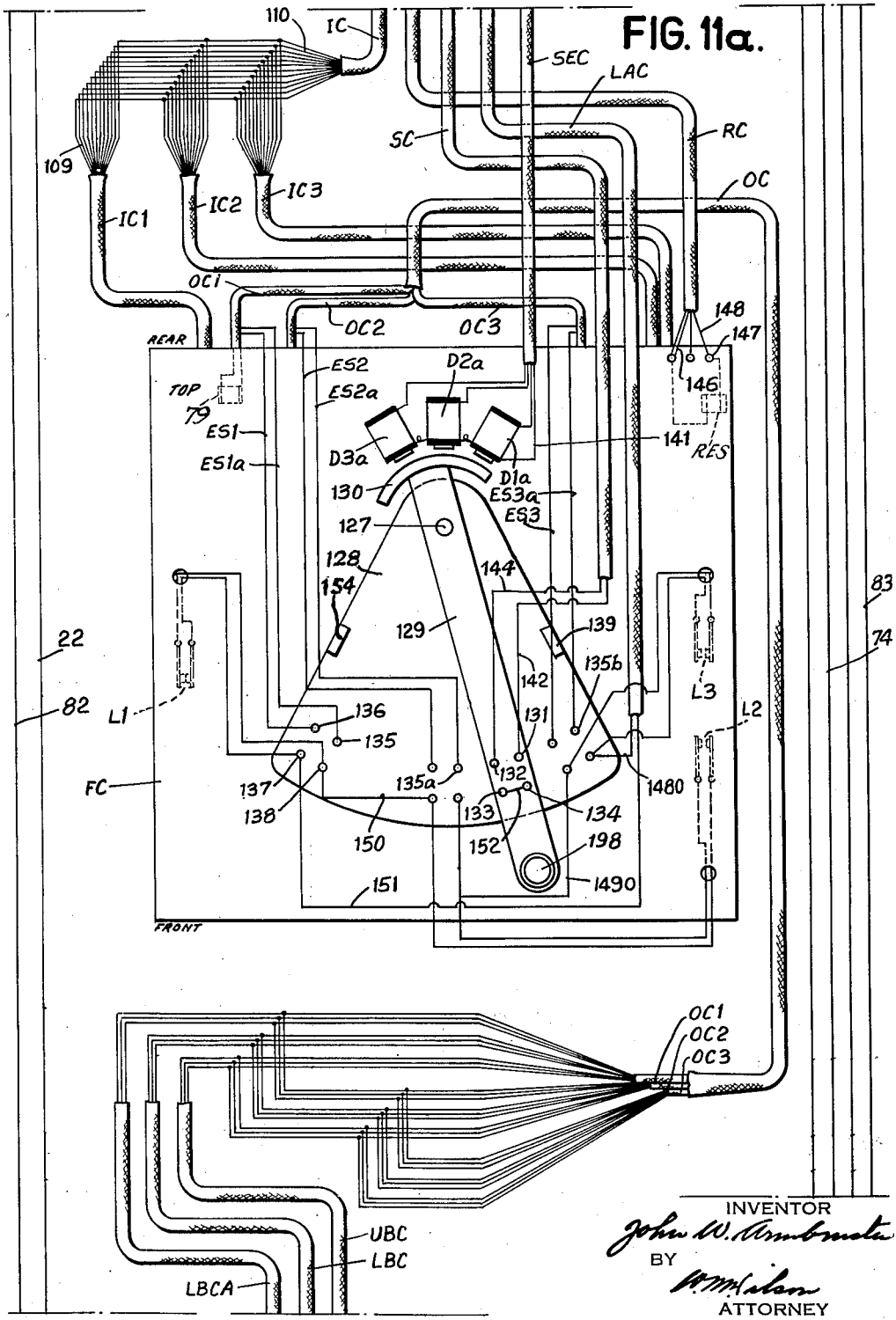
Figure 11B:
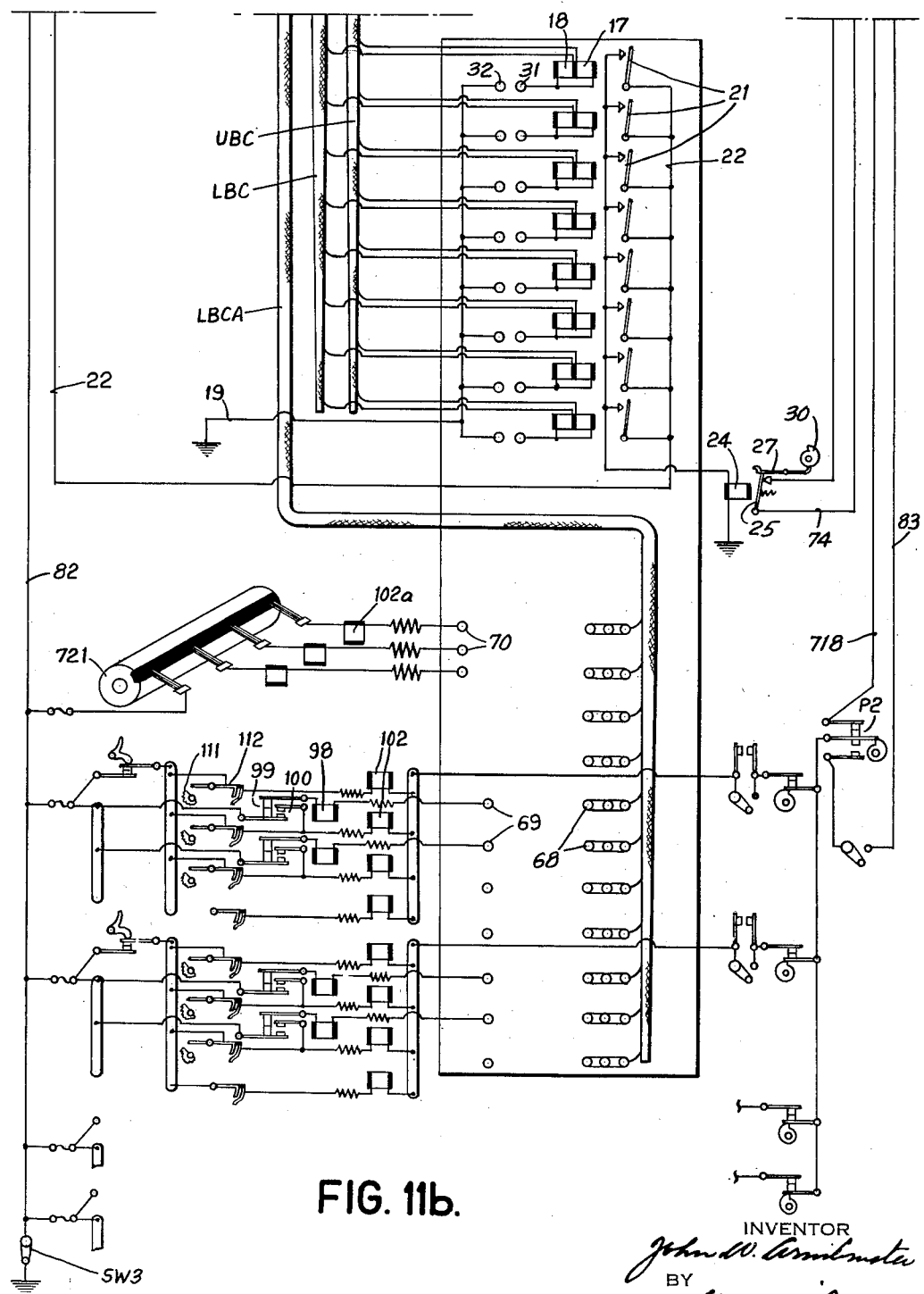

Figs. 11, 11a and 11b comprise a wiring diagram of a tabulating machine and an associated file of grid analysers.

The invention is disclosed in the form of devices associated with tabulating machines, such as those disclosed in the Bryce Patent No. 1,902,013 and Daly Patent No. 1,762,145. Machines of this kind are ordinarily operated by feeding perforated records such as the record 35 (Fig. 1) through the machine in the direction of the arrow in Fig. 1. The perforations on the record are sensed as the record moves and the location of the perforation on the record controls the timing of impulses for regulating the various accumulating, printing and group control devices. It is noted in Fig. 1 that a perforation 36 representing the digit 9 is situated near the bottom of the record so that it is sensed early in the operating cycle and thereby distinguishes from a perforation 37 representing the digit 2 which is sensed later in the operating cycle. Thus, it is evident that the functioning of the machine depends upon a movement of the record to control the timing of impulses initiated by the appearance of perforations in the record.

The devices of the present invention differ from the ordinary tabulator control by providing electrical devices for analyzing the records while at rest and providing conducting wires cooperating with the record in such a fashion that differentially timed impulses are directed through connections established at the index points where perforations are sensed. The grid devices are set forth in a divisional application, Serial No. 365,764, filed November 15, 1940.

Figure 1:
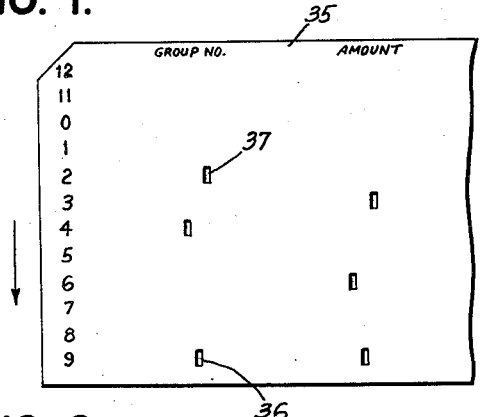
Fig. 1 is a view showing a portion of the ordinary record card.
Figure 2B:
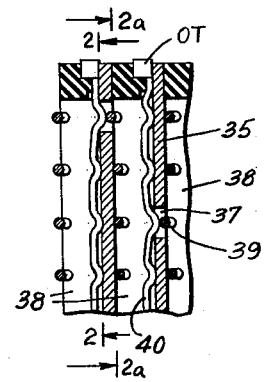
Fig. 2b is a detail view of a number of grids associated with perforated record papers so that the conducting lines on the grids establish contact through the perforations in the papers.
Figure 2:
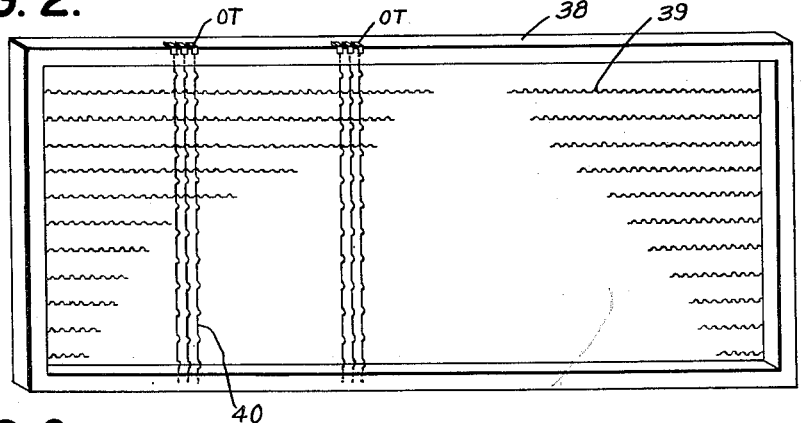
Fig. 2 is a side elevation view of one of the grids.

Fig. 2 shows one of a pair of wired grids adapted to cooperate with a stationary record to select and direct impulses timed to be representative of the data perforated in the record. A rectangular grid frame 38 may be made of "Bakelite," hard rubber or any other insulating material. Embedded in this frame are a series of horizontal wires 39 and a series of vertical wires 40. The horizontal wires are fixed to one side of the frame and the vertical wires are attached to the opposite side of the frame. These wires are crimped so that a projection is formed to coincide with the regular index point positions of a perforated record card. The horizontal wires 39 may be formed with either 45 or 80 of such crimped projections, according to whether it is desired to use the grids in connection with 45 column or 80 column record cards. The vertical wires 40 are formed with 12 crimped projections coinciding in position with the 12 columnar positions illustrated in Fig. 1. When two grids are placed together, the projections of vertical wires of one grid coincide with projections on horizontal wires of the other grid, so that contact is established at all crimped points on the grids. However, when a perforated record is placed between two grids, all wire projections are separated and insulated from each other except those projections coinciding with a perforation.

Fig. 2b shows how contact is established by a crimp on a horizontal wire 39 contacting with a crimp on a vertical wire 40 through a perforation 37 in a record 35.

The impulses directed through the grids are received at input terminals IT (Fig. 2a) and pass through the horizontal lines 39 of one grid, thence through the perforations in the record to the vertical lines 40 (Fig. 2) of another grid and up to output terminals OT embedded in the upper edge of the grid frame 38. Each of the twelve horizontal lines 39 is connected to one of the terminals IT and insulated from all others by the composition of the frame. In a similar manner, each of the eighty vertical lines 40 is connected to one of the terminals OT and insulated from all others.

As explained more fully hereinafter, controlling impulses are directed through the horizontal lines 39 at differential times. The bottom line 39 receives the first impulse which coincides in time with the usual "9" impulse of the ordinary tabulator cycle. A second impulse is directed into the horizontal line 39 second from the bottom, and the other impulses follow in order up the grid frame. Should one of the vertical wires 40 in one grid frame protrude through a "9" perforation 36 (Fig. 1) in contact with the lowest horizontal wire 39 in another grid frame, it is apparent that the "9" impulse will be received and transmitted through the upper terminal OT. In a similar fashion any other differentially timed impulse will be carried along a related horizontal line, picked out by the contacting vertical line and carried up to the output terminal OT, at which point it passes through a contacting connection and is carried into the tabulator as disclosed more fully hereinafter.

Figure 2A:
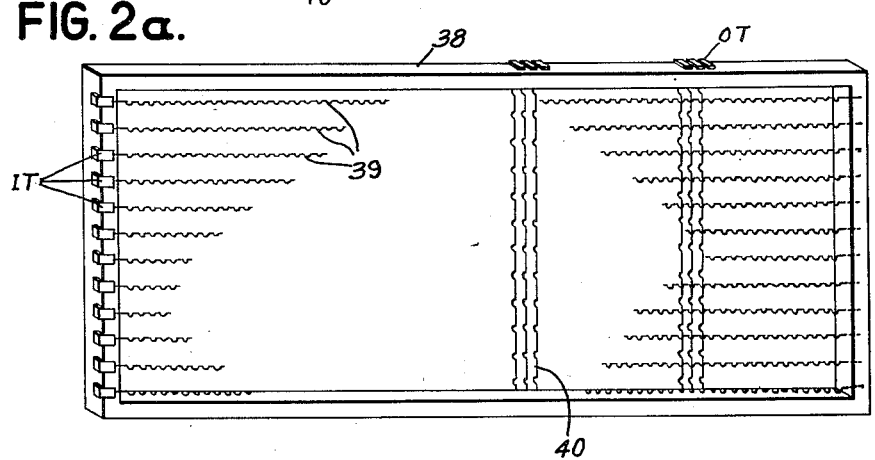
Fig. 2a is a view showing the other side of a grid such as that shown in Fig. 2.
Figure 3:
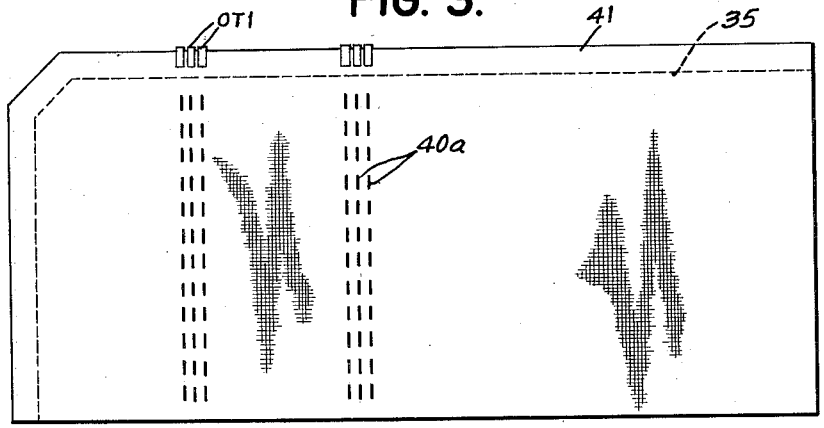
Fig. 3 shows a grid made of wires woven in insulation material.
Figure 3A:
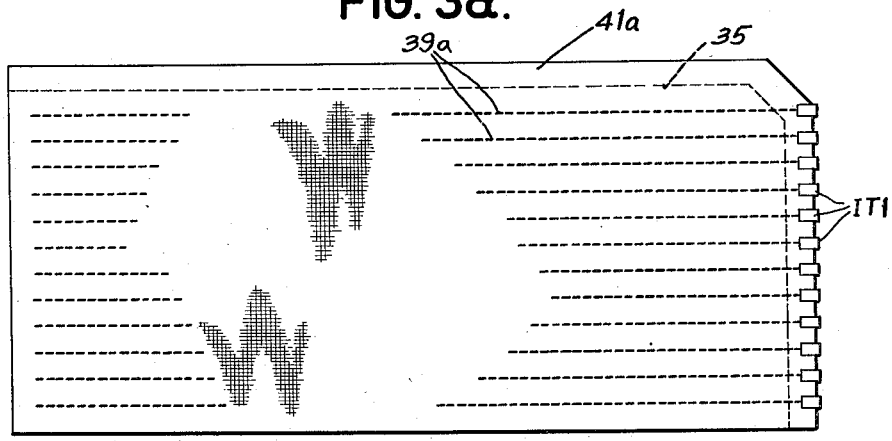
Fig. 3a is a rear view of another woven grid which is a companion to the grid shown in Fig. 3.
Figure 3B:
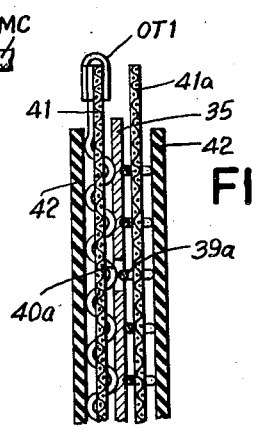
Fig. 3b is a detail view of a pair of grids such as those shown in Figs. 3 and 3a associated with a perforated record.

The grids shown in Figs. 3 and 3a operate in the same fashion as those shown and described with reference to Figs. 2 and 2a, the only difference being in the construction and arrangement of the wires or lines in the grids. The body of a grid 41 (Fig. 3) is made of woven insulation material made of vegetable, mineral or animal fibers. Into such material are woven the electrical conducting lines or wires 39a and 40a corresponding to the lines 39 and 40 described hereinbefore. A grid 41a carrying the horizontal lines is separate from the grid 41 woven with the vertical lines. The horizontal lines 39a (Fig. 3a) project at points coincident with the regular index points of the record. The points of projection are established by the manner of weaving the line through the material. For cooperation with 80 column cards, each line 39a is woven to project eighty times in its path across the grid material 41a. In a like manner the vertical wires 40a (Fig. 3) are woven in the material 41 to project at intervals coincident with the 12 index positions along a vertical line on the regular perforated record card. These lines 39a and 40a end in terminals IT1 and OT1, respectively, for receiving and emitting the impulses selected by contact of certain horizontal lines of one grid with the vertical lines of another grid through the perforations of a record as illustrated in Fig. 3b. There, it is noted that the third horizontal line 39a from the top, projects at a point coincident with a perforation the record 35 and there co-operates with the woven projection of a vertical line 40a threaded through grid 41. A pair of insulation spacers 42 are provided in order to separate wires of adjacent grids cooperating with different records.

Figure 4:
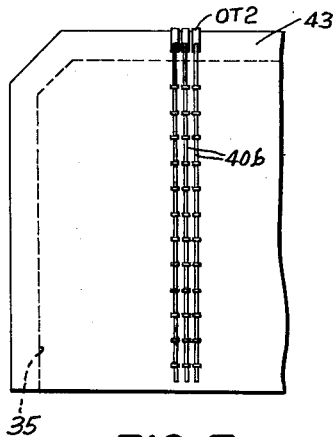
Fig. 4 is a view of a portion of a grid made by depositing metallic lines on paper.
Figure 4A:
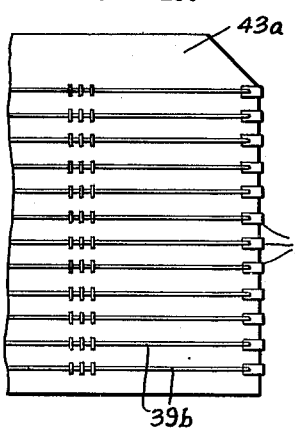
Fig. 4a is a view showing the other side of a grid such as that shown in Fig. 4.

In Figs. 4 and 4a there are shown grids of a third form. The body 43 of the grid is made of a thin insulating material such as paper, "Bakelite," etc. On this material the conducting lines are built up by deposits of a metallic electric conducting substance distributed over the area of the grids in the form of vertical and horizontal lines. The vertical lines may be placed on a grid separate from the grid carrying the horizontal lines, or the different lines may be deposited on opposite sides of the same grid sheet.

Fig. 4 shows a grid containing the vertical lines 40b upon which raised index points are built up by successive deposits of the metallic substance at an angle to the vertical line. There are twelve such raised deposits along the length of the vertical line, each deposit appearing at a point coincident with the regular twelve index points on a perforated record. In a similar fashion the horizontal lines 39b (Fig. 4a) are built up at regular intervals coincident with the 80 columns of the ordinary tabulating card.

The edges of these paper grids are provided with terminals IT2 and OT2 similar to the terminals already described. However, in connection with these paper grids greater care is taken to ensure contact between the lines on the grid and the terminals. The method of establishing such contact is shown in successive steps illustrated in Figs. 5, 5a and 5b.

Figure 5:
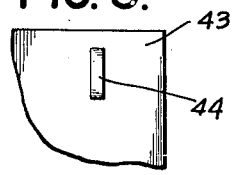
Figs. 5, 5a and 5b show the successive steps to be taken in depositing a metallic line on a sheet of material and associating a contact terminal therewith.
Figure 5A:
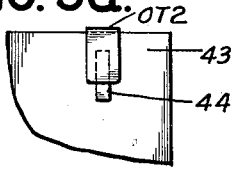
Figure 5B:
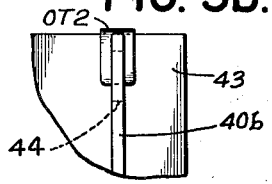

Fig. 5 shows a deposit 44 of metallic substance near the top edge of the material 43 comprising the body of the grid. This is the first step performed in attaching a terminal. In the second step, Fig. 5a, the terminal OT2 is clipped around the upper edge of the grid 43 in contact with the deposit 44 which projects below the bottom edge of the terminal. The surface of the side of the terminal is roughened to provide a receptive surface for further deposits of the metallic substance. Fig. 5b shows the appearance of the record after the third and final operation during which a vertical line 40b is deposited over the grid 43, running up over the previous deposit 44 and passing over the outer surface of the terminal OT2. Thus a double contact is established between line 40b and terminal OT2.

Figure 4B:
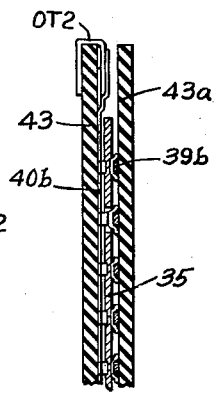
Fig. 4b is a detail view of grids such as those illustrated in Figs. 4 and 4a associated with a perforated record.

Fig. 4b is a sectional view showing how the paper grids 43 and 43a cooperate with a thin perforated record 35 so that the metallic lines establish contact through the perforations.

It is understood that when operating with any of the previously described grid constructions, pressure is applied at the sides to insure contact between line projections coinciding with perforations in the records.

Figure 6:
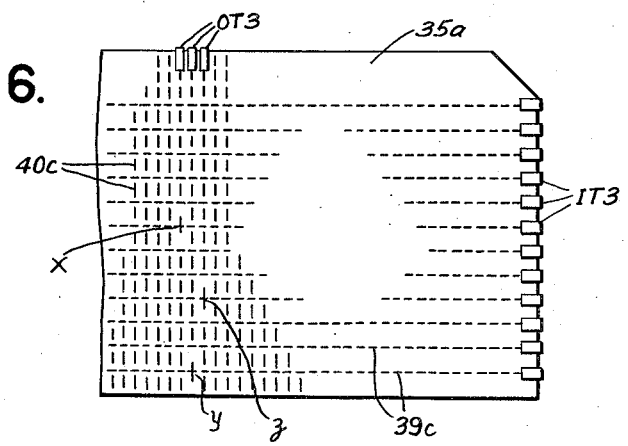
Fig. 6 shows a record element provided with grid conducting lines woven into contact at certain points to represent fixed data.

Fig. 6 shows a form of machine control element devised to take the place of the perforated record 35 (Fig. 1) and to operate in the manner described with relation to the grids without requiring the provision of separate grids, the record itself containing the lines forming the grid connections. The body 35a of this element may be made of woven cotton or glass threads, or it may be composed of other insulation materials such as paper or "Bakelite" which are perforated at intervals to simulate woven material. Through this element a series of twelve horizontal conducting lines 39c are threaded or deposited in such a fashion that they appear at intervals, first on one side of the record and then on the other side. Other lines 40c are woven in a vertical direction in such a manner that at most of the points of intersection of the horizontal lines therewith, the two different lines are separated by the material 35a. However, contact is established at certain select points of intersection X, Y and Z in order that the contacting conducting lines may form a readout means for emitting a plurality of differentially timed impulses.

On the element shown in Fig. 6 it is noted that the weaving of the lines differs from the usual arrangement in three places, at points X, Y and Z. At these points the horizontal lines come into contact with the vertical lines which are there woven out on the same side of the material 35a as the horizontal lines and directly in contact therewith, the result being that when a regular series of timed impulses are received at the terminals IT3 attached to the end of the horizontal lines 39c, three of such impulses are selected to be emitted through the upper terminals OT3. The intersection X is made at a point in the "3" impulse horizontal receiving line and connected to the highest order vertical emitting line. The other two points of connection, Y and Z, are arranged to read out "9" and "6" impulses, respectively. Therefore, the record element shown in Fig. 6 is constructed with a series of intersecting lines or wires, said lines contacting to represent the number 396.

When records such as that shown in Fig. 6 are stacked together in the file, they will be separated by spacers such as pieces of paper or "Bakelite" in order that the conducting lines of the adjacent records may be prevented from establishing contact.

Figure 7A:
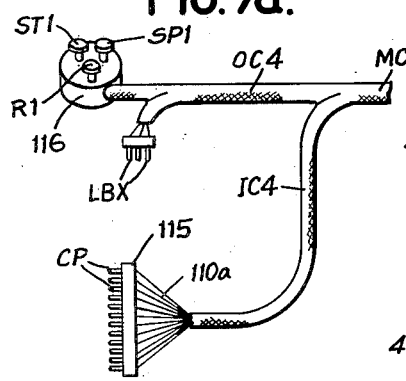
Fig. 7a shows another form of sensing device adapted for remote control of a tabulator. This type of record analyzer does not require the removal of the record from a file.
Figure 7:
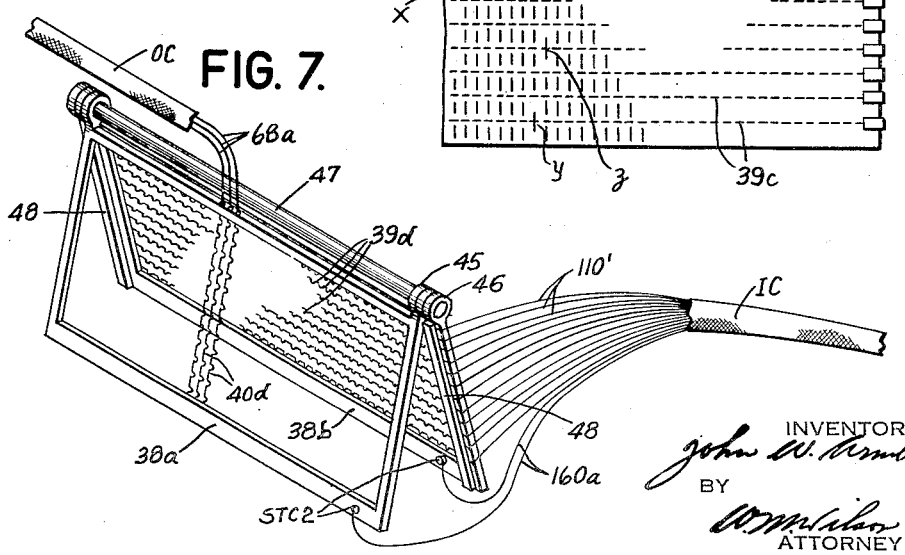
Fig. 7 is a detail view of an analyzing frame in which a record card may be analyzed by the grids of intersecting wires connected for remote control of a tabulator.

Fig. 7 shows a form of construction wherein a pair of grid frames 38a and 38b are held in fixed relationship with regard to a pivoted construction at one end of said grids. The upper edges of the grids are extended to form bearing loops 45 and 46 encircling the rod 47 which acts as the pivot for the closure of the grid frames. The outer frame is formed with a pair of side guides 48 for confining a perforated record placed between the grids. This large frame 38b carries the twelve horizontal wires 39d tending to establish contact through any perforations in the eighty positions along a row of index points. These horizontal wires 39d are insulated from each other and connected through a cable IC to the impulse emitter in the tabulator. When the small frame 38a is pressed down on the record, the vertical wires 40d mounted therein establish contact with certain of the horizontal lines depending on the location of perforations in the record. The impulses selected by the contacting vertical lines are carried up and over to the tabulator through the cable OC.

These selected impulses then control the adding and printing operation of the tabulator. As the grid frames are brought together to sense the record therebetween, contact is established between another pair of fixed contact points STC2, one of which is mounted near the lower edge on the inner surface of each of the grids. These contacts are plug wired in parallel with the tabulator start contacts 80 (Fig. 11) to initiate operation of the tabulator as soon as the grid frames are in position to receive and direct impulses.

The construction of Fig. 7 requires that the records be removed singly from the file and placed between grids 38a and 38b. Other automatic sensing devices may be used to avoid disturbing the records. The records and associated grids are filed according to any of the data appearing on records and remain in the file while being analyzed. In Fig. 8 there is shown a compartment or drawer D1 in which a series of records 35 and their associated grids 38 are filed in groups according to group numbers appearing as differentially located perforations near the left side of the records. In Fig. 1 such a group number is shown at the left in the card 35 perforated to represent classification number 492. The other perforations in this record represent an amount $6.93.

In Fig. 8 the placement of group numbers and amounts are indicated by the two sets of terminals OT, one set near the left side of the records and the other set running along the top of the center part of the records.

The grid frames 38 and records 35 are located in the drawer D1 by a pair of raised runners 49 fixed to, and extending along, the top of the base of the drawer. A rearward stop 50 is provided as a backing member against which the file of grids and records are pressed to insure contact between the lines and wires of the grids. This backing member 50 is set in a pair of slots such as the slots 51, 52 cut inside an opening 53 extending through the center of the base of the drawer. Slidably mounted at the rear of the drawer is a notched slide 54 located in the opening 53. This slide 54 is pressed toward the rear of the drawer by coil spring 55 wound around a rod 56 extending through the front of the drawer and terminating in a handle 57. When it is desired to remove any records from the file or place any new records in the file, the handle 57 may be grasped and pulled outwardly to relieve the pressure of a face plate 58 which is mounted in the slots of the slide 54 in such a position as to press against the front of the file of records. As the pressure slide 54 is pulled outwardly, it may be latched in an extended position by means of a pawl 58 pivoted at 59 on the bottom of the drawer. This pawl is placed into cooperation with the notches on one side of the slide 54 by means of a spring 60 attached between the pawl and the bottom of the drawer. After the operation of filing has been completed, pressure may be again applied to the records by merely tripping the pawl 58. This is done by pulling on the knob 61 which is at the end of the rod 62 connected to an arm on the pawl 58. When the pawl is disengaged, the spring 55 again becomes effective to press the grids and records towards the rear of the drawer against the stop member 50.

Mounted in vertical alignment between the front and rear walls of the drawer are a series of twelve conducting bars C spaced to coincide with the terminals IT extending at the right side of the grid frames. These conducting bars carry the incoming impulses brought to the drawer by a cable from the tabulator emitter. The bottom conducting bar C carries the "9" impulse, the second bar from the bottom carries the "8" impulse and the other bars carry all other regular impulses in regular order up to the top bar which carries the "12" impulse which is used at times for class selection, and other special controls in the tabulator.

A pair of parallel rods 63 and 64, situated near left wall of the drawer and fixed to the front and rear walls of the drawer, carry a slidable sensing carriage 65. This carriage carries three sets of sensing contacts or brushes UB, LB and LBA extending down through a horizontal platform 66. The three front contacts UB and the three rear contacts LB are located in alignment with the three lines of terminals OT at the left side of the grids in the positions associated with the group number perforations. The three sensing contacts LBA are located so as to cooperate with the terminals OT at the center of the records in a position cooperating with the amount representing the perforations. This arrangement is only specified by way of illustration and is not designed as any restriction on the positions of sensing devices cooperating with the grids.

Normally, the carriage 65 is positioned with the set of contacts UB removed from the rear grid terminals OT by one space of carriage movement. This space is exaggerated in Fig. 8 merely for the purpose of illustration. A spring 67 wound around a rod 63 between the rear of the drawer and the rear of the carriage tends to force the carriage toward the front of the drawer. However, such movement is controlled by an escapement pawl 68 cooperating with a fixed rack 71 mounted in the drawer.

The pawl 68 is loosely pivoted on a stud 72 fixed on a plate 73 secured to the side of the frame 65 by means of screws 75 (Fig. 8b). The rear of the pawl extends in the form of an offset auxiliary hook 76 which engages rack 71 as soon as the front part of the pawl 68 is disengaged therefrom. Attached to the extension 76 is a spring 77 tending to rock pawl 68 in a clockwise direction to place the stopping surface between the teeth of the rack. Mounted on an insulation pad 78 (Fig. 8) fixed to the top of movable carriage frame 65, is an escapement control magnet 79 located under an armature piece 81 fixed to the end of a pawl 68. When magnet 79 is energized, armature 81 is attracted and operates pawl 68 in a counterclockwise direction to lower the front end of the pawl out of cooperation with the teeth on the rack 71. As the pawl rocks in the counterclockwise direction, the rear hook 76 engages one of the teeth on the rack after the carriage frame has shifted a distance of about one-half tooth space. Subsequent de-energization of magnet 79 allows spring 77 to come into play to restore pawl 68 to the normal position wherein it engages the next tooth on the rack 71. Meanwhile the carriage has escaped one step towards the front of the drawer.

A compression spring 85 presses under a horizontal projection 86 extending from the lower part of pawl 68. This spring is provided for the purpose of holding the hooked portions of the pawl 68 in cooperation with the rack. There are times when it is desired to shift the pawl out of cooperation with the rack. Referring to Fig. 8b, it is seen that the stud 72 has a wide shoulder upon which pawl 68 is fulcrumed in such a loose manner that the effective ends of the pawl may be cammed out of cooperation with the rack teeth as the carriage frame 65 is shifted toward the rear of the drawer to restore the sensing devices.

The detail view in Fig. 8a illustrates the shape of the rack teeth when viewed from the bottom. There it is seen that the teeth are not only cut at an angle with regard to the horizontal plane but they are also cut with a surface 88 inclined with reference to a vertical plane. It is along these angular surfaces 88 formed on the sides of the rack teeth that the end of pawl 68 ratchets as the sensing devices are restored.

The wires carrying the outgoing impulses from the sensing devices UB, LB and LBA and magnet 79 are contained in a cable OC1 fastened to the rear of the drawer by a clip 89. A substantial portion of cable OC1 is coiled in a helix within a spring retainer 90 which tends to pull the free length of cable toward the rear of the drawer. As the carriage frame 65 moves toward the front of the drawer, coil after coil of the cable is released to follow after the carriage.

The path traced by impulses within the drawer may be followed, first in a forward direction along the conducting rods C, then through the terminals IT, across the horizontal grid lines, then up through the vertical grid lines to the terminals OT whereupon they are sensed by the contact members UB, LB or LBA and then out through the wires in cable OC1.

When operating the device by remote control from a tabulator, it is desirable to know when the sensing carriages 65 of one or more of the drawers are restored to normal position. For the purpose of testing the position of the carriage in a drawer, a pair of contacts L1 are mounted on an insulation block 92 fixed to the side of the drawer. One of the leaf spring blades holding contacts L1 is provided with a cam piece 93 situated in the path of a stud 94 extending from the side of carriage frame 65. When the carriage frame moves forward to start a sensing operation, the stud 94 is moved out of cooperation with the cam 93 and the spring tension in the contact blade on which it is mounted, acts to separate contacts L1. If the carriage is fully restored, the stud 94 cooperates with cam 93 to close contacts L1. Other carriage position testing contacts L2 and L3 are controlled in a manner similar to the control of contacts L1 and are provided in drawers D2 and D3.

Provisions are made for restoring the sensing carriage 65 (Fig. 8) after it has moved toward the front of the drawer to sense the groups of records in which the operator is interested. The restoring devices are mounted under the bottom of the drawer D1 which is cut with a slot 95 through which a downward projection 65a extends from the carriage frame. Referring to Fig. 10, it is seen that the carriage frame extension 65a is engaged by the slotted end of an arm 96 pivoted at 97 on the bottom of the drawer. Pivoted to arm 96 is a link 98 connected to a plunger 104 of a restoring solenoid RES. As the carriage frame is moved toward the front of the drawer D1 in sensing successive records, the arm 96 (Fig. 10) is rocked in a clockwise direction to move away from a stop stud 105 and draw the plunger 104 out of the solenoid RES. When it is desired to restore the carriage frame, solenoid RES is energized from a remote point, preferably situated near tabulator controls. The operation of the solenoid serves to rock the arm 96 in a counterclockwise direction moving extension 65a and the carriage 65 toward the rear until the arm strikes against stop stud 105 which determines the position wherein the carriage frame 65 (Fig. 8) is positioned to close contacts L1.

In Fig. 9 the rear of a cabinet FC is shown cut away to reveal the wiring connections at the rear of drawer D1. There it is seen that the cable OC1 projects through the rear of the drawer and it is wound in a helical coil 106 before it is attached to the rear wall of the cabinet. This coil 106 is provided so that the wiring connections are maintained even when the drawer is drawn out of the front of the cabinet for the filing of records. Similar coil arrangements are provided at the rear of drawers D2 and D3 from which the cables OC2 and OC3 project.

Another cable IC1 (Fig. 9) is connected to the rear of drawer D1 by a clip 107 which holds the coil 108 away from the rear of the cabinet. This cable IC1 includes the lines for carrying the incoming impulses to the sensing devices. Each of the twelve wires 109 within cable IC1 are fastened to a related conducting bar C (Fig. 8) which is one of the bars making contact with the terminals IT. There are two other such cables identified as cable IC2 and cable IC3 for carrying impulses to the other two drawers in the cabinet. Each cable is wound in a coil such as coil 108 permitting movement of the drawer. The wires extending from these three cables are connected in parallel to a series of twelve wires 110 extending from a common cable IC connected to the impulse emitter in the tabulator as described more fully hereinafter. The impulses travel from the tabulator to the cabinet through cable IC and return from the cabinet to the tabulator through cables OC1, OC2 and OC3.

Parallel with the line of conductors C (Fig. 9) is a set of twelve conducting sockets CS. Each of the twelve sockets is connected to a related conducting bar C. An opening 114 in the rear of the cabinet FC provides access to these sockets so they may be plugged to the tabulator when the permanent wiring in cable IC is not used.

The devices shown in Fig. 7a are provided for making a manual selection of the particular drawer, record and columns of the record to be sensed. When using the devices of Fig. 7a it is not necessary to operate the carriage frame 65 (Fig. 8) nor is it necessary to operate other connections by remote control from the tabulator to select which of a plurality of drawers is to control operation of the tabulator. The records are not removed from the file but are sensed directly in the filed position. In Fig. 7a it is seen that a main cable MC connected to the tabulator is divided into two branches OC4 and IC4, the former holding the wires used for returning impulses to the tabulator and the latter containing wires carrying impulses from the tabulator emitter. Cable IC4 contains a set of twelve wires 110a each of which passes through an insulation bar 115 and extends as one of a set of twelve conductor plugs CP adapted to be connected with the sockets CS (Fig. 9) behind the opening 114. By selectively connecting these plugs CP to any one of the sets of sockets CS, a choice may be made at the cabinet of the drawer of records to be used in controlling the tabulator.

The other branch OC4 (Fig. 7a) of the cable MC corresponds in operation with the output impulse cable OC1 (Fig. 8). However, the terminals of the wires in cable OC1 were restricted to movements in a straight line from front to rear of the drawer, and they were also controlled for sensing the records only in successive order by means of the carriage escapement mechanism. The terminals LBX (Fig. 7a) extending from cable OC4 are not restricted to cooperation with any particular portion of the records, nor are they restricted to the cooperation with any particular record, or the successive cooperation with the records. The operator may grasp the end of this cable and bring the contacts LBX into cooperation with any of the terminals OT extending from the top of any grid. In this way a manual selection may be made to read out any desired portion of the data represented on one or more of the records which remain in place in the file.

The devices disclosed in Fig. 7a have a wide range of usefulness because they contain remote controls for the tabulator. Cable OC4 not only contains wires for sensing the records, but it also contains three pairs of wires which are connected to contacts in a box 116 formed as a continuation of the end of cable OC4. Projecting from this box 116 is a set of auxiliary tabulator control keys, start key ST1, stop key SP1 and reset key R1. These keys operate the related contacts in box 116 to establish shunt circuits through wires in cable OC4 plugged around the ordinary key controlled contacts situated in the tabulator. The usual stop key contacts 87, Fig. 11, which are normally closed, are held opened when it is desired that stopping be controlled at a remote point by the operation of stop key SP1, Fig. 7a.

Figs. 11, 11a and 11b disclose a wiring diagram of the tabulator and the connections therefrom to the filing cabinet. In this diagram the devices illustrated in Figs. 11 and 11b refer mainly to the structure found in tabulating machines such as that disclosed in the Bryce Patent 1,902,013 and Daly Patent 1,762,145. The devices illustrated in Fig. 11a show the wiring connections from the tabulator to the filing cabinet and the impulse delivering connections from the cabinet to the tabulator. Fig. 11 deals mainly with devices for controlling the tabulator and means for sending timed impulses to the filing cabinet.

The power switch PS (Fig. 11) is opened so that when the tabulator is controlled remotely by stationary records in a filing cabinet, the operating source of current is provided by a direct current generator DCG grounded at one terminal and selectively connected in the operating circuit by the switches SW1 and SW2. Switch SW2 and wires 117 connect the generator to the main line 83 so that a single direction of polarity is maintained from line 83 to line 82. In the ordinary tabulator, the polarity of the impulses from the upper brushes differs from the direction of the impulses through the lower brushes. However, since the contacts UB (Fig. 8) and LB derive their directional impulses from a common source through conductors C, the devices of the present invention are arranged to operate with impulses of a common polarity just as the group control devices of Patent No. 1,902,013.

When the tabulator is connected for control by the grid analyzers of the present invention, the usual upper and lower brushes 11 and 12 (Fig. 11) are not used and the plug wiring therefrom may be removed from the sockets connected to the adding, printing and group control magnets. A card feeding unit 13 is not used but it may be allowed to operate without placing any records in the magazine. The usual upper and lower card lever contacts 63' and 64' ordinarily close when cards are fed through the regular sensing unit, but in the present instance they may be shunted by closing switches 118 and 119 to provide shunt circuits around the contacts.

An impulse emitter E is provided in the tabulator for initiating in each cycle a set of twelve differentially timed impulses corresponding with the impulses usually sensed when reading the perforations of a record card. This emitter is connected to be driven by mechanism found in the tabulator. The motor TM (Fig. 11) is connected with a shaft 260a to turn it one revolution per card cycle. The pinion 120 is mounted on the end of this shaft 260a and brought into mesh with a gear 121 fixed to an emitter shaft 122 attached to a pair of brushes 123 fixed on the ends of a cross bar attached to the shaft. The pinion 120 and gear 121 are proportioned so that shaft 122 makes one-half revolution per card cycle. As shaft 122 turns, one of the brushes 123 cooperates with a semi-circular common contact member 124 while the other brush makes successive contact with twelve insulated commutator segments 125 fixed in a semi-circular arrangement around the periphery of emitter E. The first segment 125 is touched at a time corresponding with the appearance of the "9" index point in the ordinary tabulator cycle. All the other impulses follow in regular order just as though delivered through the perforations of a record card. The common contact bar 124 is connected to wire 117 by a wire 126. The individual commutator segments 125 are each connected to a wire 110, twelve of such wires being grouped in the cable IC. These wires 110 (Fig. 11a) are connected separately to three other sets of wires 109, each set containing twelve wires 109, three related wires of different sets being connected in parallel with one wire 110. The sets of wires 109 are assembled in separate cables IC1, IC2 and IC3 each connected to one of the drawers of the filing cabinet. There they are connected to the conducting bars C (Fig. 9) carrying the impulses through the horizontal grid wires over to the vertical grid wires up to the terminals OT (Fig. 8) sensed by contact members UB, LB and LBA, and thence, back to the tabulator through wires in cable OC1.

Wires 110' (Fig. 7) and wires 110a (Fig. 7a) are similar to wires 110 in that they are connected to emitter E when the devices of Fig. 7 or 7a are to be used.

Referring again to Fig. 11a, it is seen that the three cables OC1, OC2 and OC3 from the various drawers, converge into a common cable OC which carries the selected impulses back to the tabulator. The wires in this output cable OC are divided in three groups according to the source of the impulses. Referring back to Fig. 8, it is noted that the group of wires connected to the contact members UB are in effect carrying impulses from upper brushes. This is because the contacts UB sense the terminals OC representing group control numbers, one step before the other sensing members LB and IBA come into operation. The second set of wires connected to the three contact members LB correspond with the impulse carrying means from the lower brushes in the ordinary tabulator. They operate at the same time as the third set of sensing connections terminating in members LBA, but the wires from members LBA are connected to adding and printing control magnets rather than group control magnets.

At the bottom of Fig. 11a, the three different groups of impulse carrying lines are seen to be separated into lines passing into three cables. A cable UBC carrying wires connected to the members UB, a cable LBC carrying the lines from the contact members LB and a third cable LBCA carrying the impulses from the members LBA.

Each of the wires in cable UBC (Fig. 11b) is connected to energize a magnet 17 which is one of a pair of differentially wound relays controlling the group control devices of the tabulator. Each wire of a related order in the other cable LBC is connected to an associated magnet 18 of the group control devices. Both of these magnets are connected in a circuit by a wire 19 which runs to a ground connection to complete the circuit. These magnets 17 and 18 are arranged so that, if they are energized at the same time (the group perforations of two adjacent records agreeing) there is no attraction of contacts 21 and consequently the machine continues in item entering operation. However, should any one of these magnets 17, 18 be energized alone, or one be energized at a different time than the other (showing that the perforations of two adjacent records do not agree) there is an unbalancing of the differentially wound control relay and this relay acts to close contacts 21 to operate the group control devices for automatically printing a total and resetting the tabulator in the well known manner explained in detail in Patent 1,902,013. The circuit through the group control magnets may be traced from the generator DCG (Fig. 11) to switch SW1, switch SW2, wire 117 and wire 126, emitter E, cable IC (Fig. 11a) cable IC1 (Fig. 9), conductors C (Fig. 8) the grid terminals and wires, contact members UB and LB, then parallel connections through cable OC1, cable OC (Fig. 11a), parallel connections in cable UBC and LBC (Fig. 11b), magnets 17 and 18 and wire 19 to the ground.

The other cable LBCA (Figs. 11a and 11b) carries impulses from the contact members LBA (Fig. 8), sensing the portions of the records referring to amounts to be added and printed. The wires in this cable LBCA (Fig. 11b) are connected to plug sockets 68 which may be selectively plugged to sockets 69 or 70 for directing impulses through adding control magnets 98 and printing control magnets 102 and 102a. The path followed by these adding and printing control impulses through contact members LBA is similar to the path previously described up to the point of plugging to the adding and printing control magnets. From there on, connection is over line 82 which is grounded through a switch SW3 (Fig. 11b). This switch is opened when control is desired within the tabulator under control of the moving record cards in cooperation with the devices shown in Patent No. 1,902,013.

Devices are provided in the tabulator for selectively conditioning an escapement magnet 78 for operation in only one of the drawers in the cabinet FC, and thus preparing the devices in that selected drawer to receive the emitted impulses from the tabulator and to return differentially timed impulses resulting from sensing the records between the grids in the selected drawer. For this purpose three drawer selection keys (Fig. 11) are provided to operate contacts DS1 and DS2 and DS3. These contacts are connected through a cable SEC with a group of three magnets D1a, D2a and D3a (Fig. 11a) associated with a magnetic switch fastened to the top of the cabinet FC. Pivoted at 127 on the top of an insulation plate 128, is a freely turning arm 129 carrying a common armature 130 arranged in an arcuate form corresponding with the arrangement of the three magnets D1a, D2a and D3a. Located on this arm 129 are a pair of contact terminals 131 and 132 and a second pair of contacts 133, 134. These four contact terminals are located in a position to contact selectively with three sets of similarly arranged contacts relating to the three drawers in the cabinet. When magnet D1a is energized, the arm 129 is turned clockwise to abut against a projection 154 and position terminals 131 and 134 in contact with stationary terminals 135 and 138, respectively, mounted on insulation plate 128. The other magnets D2a and D3a have a similar selective action to position the movable arm 129. However, the center magnet D2a operates the arm to place it over the center group of contacts including terminal 135a and the third magnet D3a operates to swing the arm 129 against the abutment 139 so that the contact terminals on the arm, rest over the four contact points including point 135b. The drawer selection circuit may be traced from the generator DCG (Fig. 11) through switch SW1, SW2, wire 117, line 83, wire 140, contacts DS1 closed when the selection of drawer D1 is desired, then through cable SEC, magnet D1a (Fig. 11a) common wire 141 (Fig. 11), switch SW5, and line 82 down to the ground connection beneath switch SW3 (Fig. 11b).

Knob 198 may be manipulated to swing arm 129 to select a drawer. Assuming that drawer D1 is selected, an example of a carriage escapement circuit may be traced through connections established when arm 129 in Fig. 11a is rocked to the extreme clockwise position. In Fig. 11 it is seen that three contacts S, P and CF, in the lower left hand corner, are mounted in parallel and all connected to a wire 144 passing through cable SC. These three contacts relate to the three methods of operating the escapement for the sensing carriage 65 in the file cabinet. Contacts S are closed manually by a space key when it is desired to shift the escapement by remote control. Contacts CF are operated automatically at the end of each listing cycle. Contacts P are also operated automatically at the end of each resetting and total printing operation of the tabulator. These two automatic controls may be disabled by opening switches SW6 and SW7. The spacing circuit may be traced from line 83 (Fig. 11) through a wire 142, cable SC (Fig. 11a), contact terminal 131 on the arm 129, fixed terminal 135, wire ES1a (Fig. 8), escapement magnet 79, return wire ES1 (Fig. 11a), fixed terminal 136, contact terminal 132 on the movable arm 129, wire 144, cable SC (Fig. 11), wire 144, either of the three contacts S, P or CF, and then through line 82 to the ground.

Remote control connections are provided to restore the sensing carriage in any of the drawers of the filing cabinet. This is accomplished by selectively energizing any of the restoring magnets RES, one of which is attached to each drawer. The restoring connections are operated by keys shown at the lower left corner in Fig. 11 in cooperation with contacts DR1, DR2 and DR3 connected to the restoring magnets RES of the drawers D1, D2 and D3, respectively. In tracing a sample of such a restoring circuit, starting at the line 83 and passing through wire 145, wire 146, cable RC (Fig. 11a), through openings 147 along the side of the filing cabinet to restoring solenoid RES (Fig. 10) through return wire 148 (Fig. 11a) to cable RC (Fig. 11), wire 148, contacts DR1 and wire 149 to line 82 and the ground. Wire 146 is a common return line from all restoring magnets RES; and the other three wires in cable RC are connected to contacts DR1, DR2 and DR3 and attached to individual restoring magnets RES on the different drawers.

The position of a sensing carriage in any drawer may be checked by noting the lamp L which is lighted whenever all sensing carriages are fully restored. Should any carriage be out of normal position, except the carriage selected for operation, this fact is indicated by the lamp L.

Assuming that all drawer indicating contacts such as the contact L1 (Fig. 8) are closed, a circuit through the three contacts and the indicating lamp may be traced as follows: starting at line 83 (Fig. 11), through wire 145, wire 1480, cable LAC, wire 1480 (Fig. 11a), contacts L3, wire 1490, contacts L2, wire 150, contacts L1 and wire 151 in cable LAC (Fig. 11), lamp L, switch S5 and line 82 to the ground. Should any drawer be selected, it is desired that the lamp L remain lighted even though the associated indicating contact be open by movement of the sensing carriage. The lighting circuit is maintained by the wire 152 (Fig. 11a) bridged between the contacts 133 and 134 which are adapted to extend over terminals such as 137 and 138 to provide a shunt connection around the contacts L1 when the sensing carriage in drawer D1 is moved out of normal position. In this way the lamp L indicates whenever all carriages are restored, in order that a selection may be made of the sensing devices in any drawer with the assurance that a complete record may be secured of all cards in the file. It is also possible to check the position of the carriages in the drawers other than the one selected for operation by the remote control connections at the tabulator.

When using the individual grid analyzer shown in Fig. 7, wires 160a connected to the start contacts STC2 are plugged to sockets 160 (Fig. 11) so that operation of the tabulator may be initiated at a remote point by the closure of the grid on a record. The data representing impulses sensed by the devices of Fig. 7 are carried through wires 68a which are connected to plug sockets 68 (Fig. 11b) which may be plugged to the adding and printing control magnets.

The sensing devices shown in Fig. 7a are connected so that the main operating functions of a tabulator may be controlled by an operator in a remote location. The contacts closed by keys ST1, SP1 and R1 are wired and plugged to sockets 160 (Fig. 11) 161 and 162, respectively, to control the start, stop and reset operation of the tabulator. Contact members LBX (Fig. 7a) are wired through cable OC4 and connected to sockets 68 (Fig. 11b) for control of accumulation and printing.

Since the basic novel features of the invention are shown and described it will be understood that various omissions, substitutions and changes in the form and details of the devices illustrated, and changes in operation may be made by those skilled in the art without departing from the spirit of the invention. It is the intention, therefore, to be limited only as indicated by the scope of the following claims.

What is claimed is:

1. In a tabulating machine, the combination with a stack of flat data retaining devices, each device provided over a data representing area with a set of spaced horizontal conducting lines representing digital value and a set of spaced vertical conducting lines representing ordinal position, said sets arranged in contiguous relation and contacting at one or more points to represent data, means for retaining said devices in stacked relation to constitute a file, with terminals of one set of lines exposed on one face of the stack and those of the other set exposed on another face of the stack, means for supplying a series of timed impulses to the exposed ends of the horizontal lines, brushes for contacting the exposed ends of the vertical lines, means for advancing the brushes to contact the devices seriatim and connections leading from the brushes to elements to be controlled.

2. In an accounting machine, the combination with a stack of data retaining devices, each device provided over a data representing area with a set of spaced horizontal conducting lines representing data value and a set of spaced vertical conducting lines representing ordinal position, said sets arranged in contiguous relation and contacting at one or more points to represent data, means for retaining said devices in stacked relation to constitute a file, with terminals of said sets of lines exposed on the exterior of the stack, means for supplying a series of impulses to the exposed ends of the horizontal lines, contact means for contacting the exposed ends of the vertical lines, means for advancing the contact means to contact the devices seriatim and connections leading from the contact means to elements to be controlled.

3. In an accounting machine, the combination with a stack of data retaining devices, each device provided over a data representing area with a set of spaced horizontal conducting lines representing data value and a set of spaced vertical conducting lines representing ordinal position, said sets arranged in contiguous relation and contacting at one or more points to represent data, means for retaining said devices in stacked relation to constitute a file, with terminals of said sets of lines exposed on the exterior of the stack, means for supplying a series of impulses to the exposed ends of the horizontal lines, conducting means leading from the exposed ends of the vertical lines, said conducting means including shiftable connections for sensing the devices, means under manual control for positioning said shiftable connections to sense a desired device, and further connections leading from the shiftable connections to elements to be controlled.

4. In a tabulating machine, the combination with a stack of flat data retaining devices, each device provided over a data representing area with a set of spaced horizontal conducting lines representing digital value and a set of spaced vertical conducting lines representing ordinal position, said sets arranged in contiguous relation and contacting at one or more points to represent data, means for retaining said devices in stacked relation to constitute a file, with terminals of one set of lines exposed on one face of the stack and those of the other set exposed on another face of the stack, means for supplying a series of timed impulses to the exposed ends of the horizontal lines, two sets of brushes for contacting the exposed ends of the vertical lines of two adjacent devices in a group control field, means responsive to passage of impulses at dissimilar times through corresponding brushes of the two sets, and means for advancing the brushes to contact successive pairs of devices seriatim.

5. In a tabulating machine, the combination with a stack of flat data retaining devices, each device provided over a data representing area with a set of spaced horizontal conducting lines representing digital value and a set of spaced vertical conducting lines representing ordinal position, said sets arranged in contiguous relation and contacting at one or more points to represent data, means for retaining said devices in stacked relation to constitute a file, with terminals of one set of lines exposed on one face of the stack and those of the other set exposed on another face of the stack, means for supplying a series of timed impulses to the exposed ends of the horizontal lines, two sets of brushes for contacting the exposed ends of the vertical lines of two adjacent devices in a group control field, means responsive to passage of impulses at dissimilar times through corresponding brushes of the two sets, means for advancing the brushes to contact successive pairs of devices seriatim, and a third set of brushes, movable with the first named brushes, and arranged to engage the second device of a pair in an amount field adjacent to said group control field.

6. In an accounting machine, the combination with a stack of data retaining devices, each device provided over a data representing area with a set of spaced horizontal conducting lines representing data value and a set of spaced vertical conducting lines representing ordinal position, said sets arranged in contiguous relation and contacting at one or more points to represent data, means for retaining said devices in stacked relation to constitute a file, with terminals of said sets of lines exposed on the exterior of the stack, means for supplying a series of impulses to the exposed ends of the horizontal lines, contact means for contacting the exposed ends of the vertical lines, a carriage upon which said contact means are mounted, means for moving said carriage step by step in one direction to bring said contact means in cooperation with the vertical lines of one device after another, means for restoring said carriage to a starting position, and connections leading from the contact means to elements to be controlled.

7. In an accounting machine, the combination with a plurality of stacks of data retaining devices, each device provided over a data representing area with a set of spaced horizontal conducting lines representing data value and a set of spaced vertical conducting lines representing ordinal position, said sets arranged in contiguous relation and contacting at one or more points to represent data, means for retaining said devices in stacked relation to constitute a plurality of files, with terminals of the sets of lines exposed on the faces of the stacks, means for supplying a series of impulses to the exposed ends of the horizontal lines, a plurality of sets of conducting means for leading impulses from the exposed ends of the vertical lines of the different stacks, means for selecting a set of conducting means related to any stack, means for controlling the selected set of conducting means to cooperate with the vertical lines of a selected device in said selected stack, and connections leading from the selected set of conducting means to elements to be controlled.

8. In an accounting apparatus, the combination with a stack of flat data retaining devices, a holder therefor, each device provided over a data representing area with a set of spaced horizontal conducting lines representing data value and a set of spaced vertical conducting lines representing ordinal position, said sets arranged in contiguous relation and contacting at one or more points to represent data, a stop in said holder, clamping means for retaining said devices in stacked relation against said stop in said holder to constitute a file, with terminals of said sets of lines exposed on the exterior of the stack, means for supplying a series of impulses to the exposed ends of the horizontal lines, an escapement rack in said holder, said rack having teeth located with respect to said stop and spaced in accordance with the thicknesses of said devices, contact means for contacting the exposed ends of the vertical lines, a carriage upon which said contact means are mounted, an escapement means on said carriage and cooperating with the teeth of said rack, means for operating said escapement means, means for controlling said operating means to control the position of the carriage, connections leading from the contact means to elements to be controlled, and means for rendering said connections and said impulse means effective after the carriage is positioned under control of said controlling means.

9. In a machine of the kind set forth in claim 3 which is operated for listing and tabulating cycles, means for controlling said positioning means for advancement of said shiftable connections to sense the devices seriatim during listing cycles, means for controlling said positioning means for the advancement of said shiftable connections to sense the devices seriatim during tabulating cycles, and means for selectively making effective or ineffective said listing control means and said tabulating control means for control over connection shifting operation.

JOHN W. ARMBRUSTER.